(12) United States Patent
Garcia et al.

(10) Patent No.: US 11,136,967 B2
(45) Date of Patent: Oct. 5, 2021

(54) ARTICULATING JOINT FOR WIND TURBINE

(71) Applicant: Inventus Holdings, LLC, Juno Beach, FL (US)

(72) Inventors: Gary Michael Garcia, Hobe Sound, FL (US); Robert W. Gallaher, Port St. Lucie, FL (US); Michael C. Wertz, Jupiter, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 747 days.

(21) Appl. No.: 16/025,436

(22) Filed: Jul. 2, 2018

(65) Prior Publication Data

US 2020/0003184 A1 Jan. 2, 2020

(51) Int. Cl.

| | |
|---|---|
| *E04H 12/18* | (2006.01) |
| *F03D 80/80* | (2016.01) |
| *F03D 13/20* | (2016.01) |
| *F03D 7/02* | (2006.01) |
| *F16C 11/06* | (2006.01) |
| *E04H 9/02* | (2006.01) |
| *F16G 15/08* | (2006.01) |
| *E04B 1/34* | (2006.01) |

(52) U.S. Cl.
CPC ............ *F03D 80/88* (2016.05); *E04B 1/3404* (2013.01); *E04H 9/023* (2013.01); *E04H 9/0237* (2020.05); *E04H 12/18* (2013.01); *F03D 7/0204* (2013.01); *F03D 13/20* (2016.05); *F03D 80/80* (2016.05); *F16C 11/0614* (2013.01); *F16G 15/08* (2013.01); *F05B 2240/221* (2013.01); *F05B 2240/50* (2013.01); *F05B 2240/90* (2013.01); *Y10T 403/32598* (2015.01); *Y10T 403/32975* (2015.01)

(58) Field of Classification Search
CPC ........ F03D 80/88; F03D 80/80; E04B 1/3404; F16G 15/08; E04H 9/023; E04H 9/0237; E04H 12/18; F05B 2240/90; F05B 2240/221; F05B 2240/50; F05B 2260/301; E04G 3/20; E04G 3/24; E04G 5/046

See application file for complete search history.

(56) References Cited

U.S. PATENT DOCUMENTS

| | | | | |
|---|---|---|---|---|
| 1,631,848 | A * | 6/1927 | Yager | E04G 3/20 182/128 |
| 2,854,291 | A * | 9/1958 | Riblet | E04G 5/04 182/87 |
| 6,116,179 | A * | 9/2000 | Swinbanks | B23Q 11/0032 104/293 |
| 6,202,365 | B1 | 3/2001 | Provitola | |
| 9,487,960 | B2 * | 11/2016 | Kent | E04G 3/20 |

(Continued)

*Primary Examiner* — Patrick J Maestri
(74) *Attorney, Agent, or Firm* — Tarolli, Sundheim, Covell & Tummino LLP

(57) ABSTRACT

An articulating joint for a wind turbine having a tower defining a shaft and a deck provided in the shaft includes a bracket extending from a first end having a fixed connection with the deck to a second end including an opening. A fastener includes a head pivotably connected to the tower and a shaft extending through the opening. A washer connected to the bracket is aligned with the opening for receiving the shaft such that the fastener is pivotable with the washer relative to the opening to allow for relative movement between the tower and the deck.

19 Claims, 12 Drawing Sheets

(56) References Cited

U.S. PATENT DOCUMENTS

| | | | | |
|---|---|---|---|---|
| 9,816,489 | B2 | 11/2017 | Venkatakrishnappa et al. | |
| 2004/0020138 | A1* | 2/2004 | Grearson | E01D 19/106 |
| | | | | 52/64 |
| 2005/0247008 | A1* | 11/2005 | Fujiwara | E04G 1/362 |
| | | | | 52/651.1 |
| 2008/0179477 | A1* | 7/2008 | Harney | E04G 5/046 |
| | | | | 248/238 |
| 2009/0126309 | A1* | 5/2009 | Lyness | F03D 13/20 |
| | | | | 52/650.3 |
| 2009/0317254 | A1* | 12/2009 | Numajiri | F03D 80/70 |
| | | | | 416/147 |
| 2010/0122508 | A1* | 5/2010 | Kristensen | F03D 13/20 |
| | | | | 52/651.01 |
| 2013/0174509 | A1* | 7/2013 | Reed | E04H 12/08 |
| | | | | 52/655.1 |
| 2017/0051722 | A1* | 2/2017 | Knoop | F03D 1/065 |
| 2017/0207608 | A1 | 7/2017 | Eder et al. | |

\* cited by examiner

ARTICULATING JOINT FOR WIND TURBINE

TECHNICAL FIELD

This disclosure relates generally to wind turbines and, more specifically, is directed to an articulating joint allowing for relative movement between a wind turbine tower and interior decking.

BACKGROUND

During operation, the various components of a wind turbine experience various loads due to, for example, the speed of the wind and the interaction of the wind with the rotor blades and other components of the wind turbine. In particular, the tower may be subjected to various loads during operation. For example, the tower may be subjected to bending loads during operation as wind interacts with the rotor blades and the tower itself. Such loading of the tower can subject various components of the tower to high stresses.

SUMMARY

In one example, an articulating joint for a wind turbine having a tower defining a shaft and a deck provided in the shaft includes a bracket extending from a first end having a fixed connection with the deck to a second end including an opening. A fastener includes a head pivotably connected to the tower and a shaft extending through the opening. A washer connected to the bracket is aligned with the opening for receiving the shaft such that the fastener is pivotable with the washer relative to the opening to allow for relative movement between the tower and the deck.

In another example, an articulating joint for a wind turbine having a tower defining a shaft and a deck provided in the shaft includes a bracket. The bracket extends from a first end having a fixed connection with the deck and including a first opening to a second end including an elongated second opening. The bracket is positioned on a first side of the deck. A cap plate positioned on a second side of the deck includes an opening aligned with the first opening in the bracket. A bolt has a head and a shaft. The shaft includes a splined portion having a press-fit connection with the first opening in the bracket and a threaded portion extending through the deck for securing the bracket to the deck. A heim joint includes a head pivotably connected to the tower and a shaft extending through the elongated second opening in the bracket. A washer is connected to the bracket and aligned with the elongated second opening for receiving the shaft such that the heim joint is pivotable with the washer relative to the elongated second opening to allow for relative movement between the tower and the deck. A damper is provided through which the shaft of the heim joint extends for damping relative movement between the tower and the deck.

In another example, a method for connecting a deck inside a shaft of a wind turbine to a wall of the wind turbine includes providing a bracket extending from a first end to a second end including an opening. The first end of the bracket is secured to the deck. A head of a fastener is pivotably connected to the wall of the tower such that a shaft of the fastener extends through the opening in the bracket. The shaft is inserted through a washer connected to the bracket and aligned with the opening such that the fastener is pivotable with the washer relative to the opening to allow for relative movement between the tower and the deck.

Other objects and advantages and a fuller understanding of the invention will be had from the following detailed description and the accompanying drawings.

DETAILED DESCRIPTION

Figure 1:
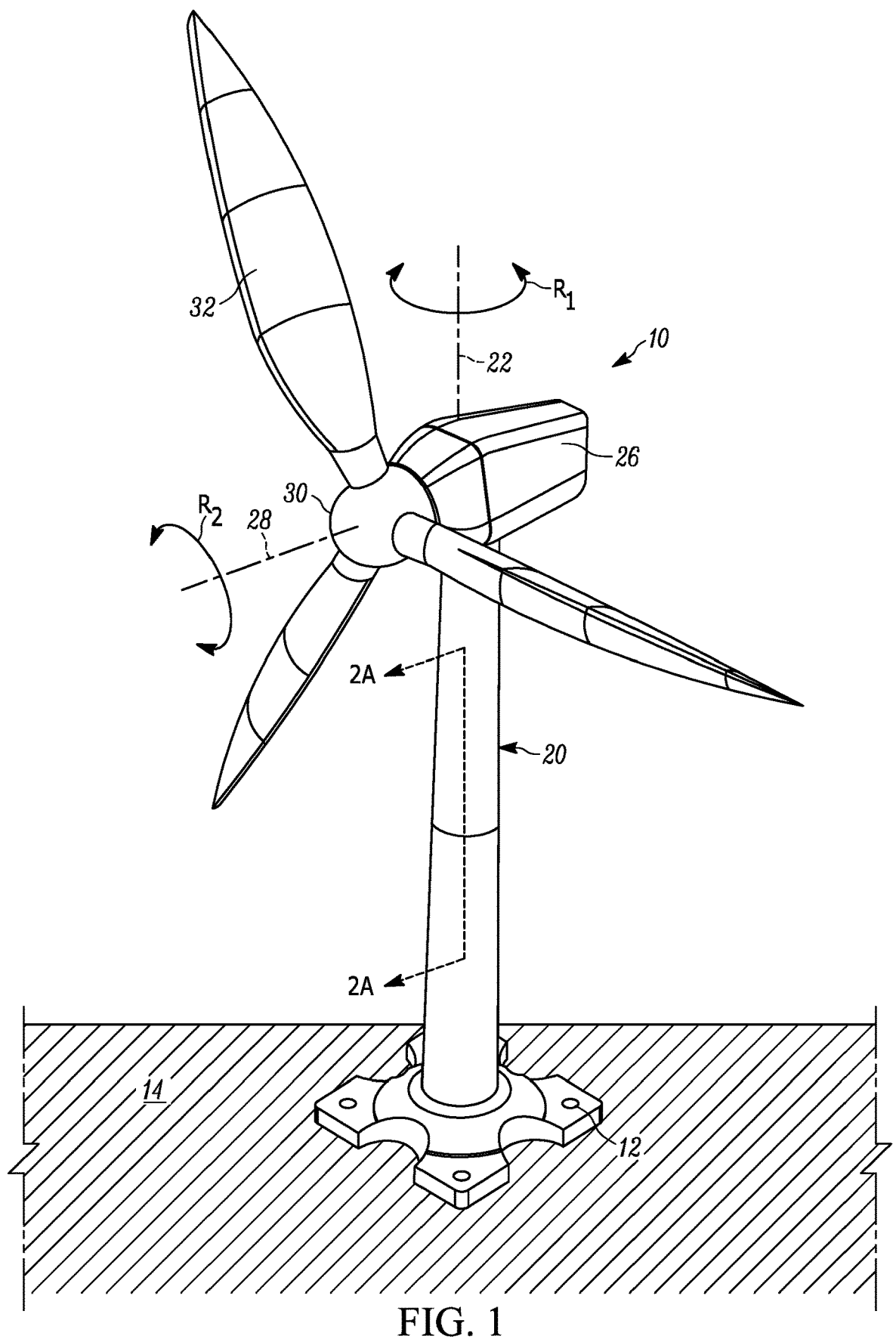
FIG. 1 is a schematic illustration of an example wind turbine.

This disclosure relates generally to wind turbines and, more specifically, is directed to an articulating joint allowing for relative movement between a wind turbine tower and interior decking. An example wind turbine 10 is shown in FIG. 1. The turbine 10 includes a base 12 secured to the ground 14. A tower 20 extends upward from the base 12 and along an axis 22 away from the ground 14. A nacelle 26 is secured to the top of the tower 20 and extends transversely therefrom. The nacelle 26 is rotatable about the axis 22 relative to the tower 20 in the manner indicated generally at $R_1$.

A hub 30 is secured to the nacelle 26 and is rotatable about an axis 28 in the manner indicated generally at $R_2$. Rotors 32 radially outward from the hub 30 rotate therewith in response to wind to turn a shaft (not shown) for generating electricity.

Figure 2A:
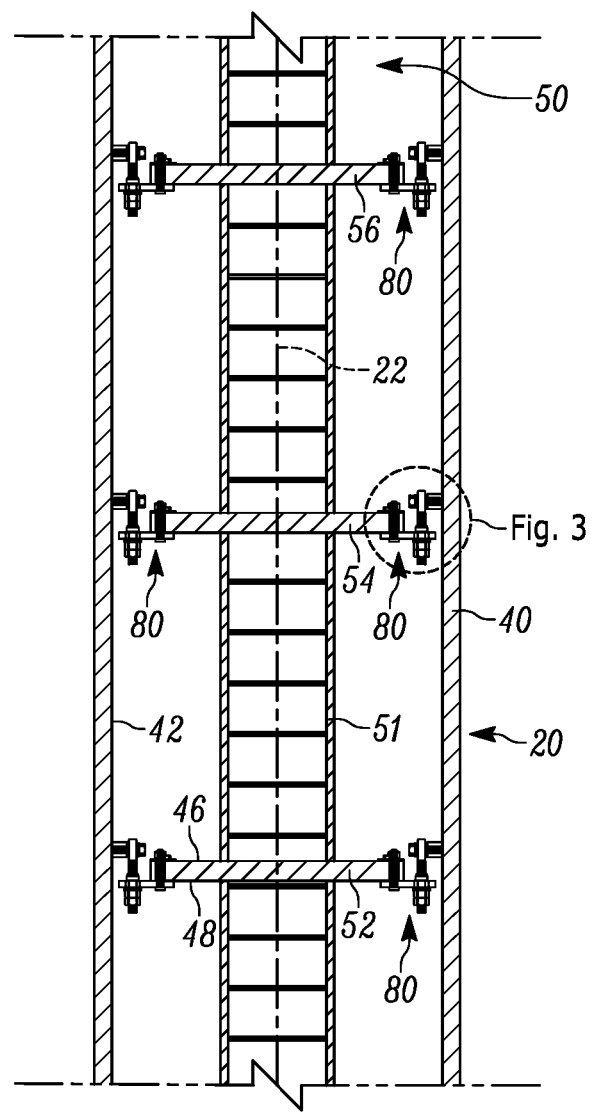
FIG. 2A is a section view taken along line 2A-2A of FIG. 1.
Figure 2B:
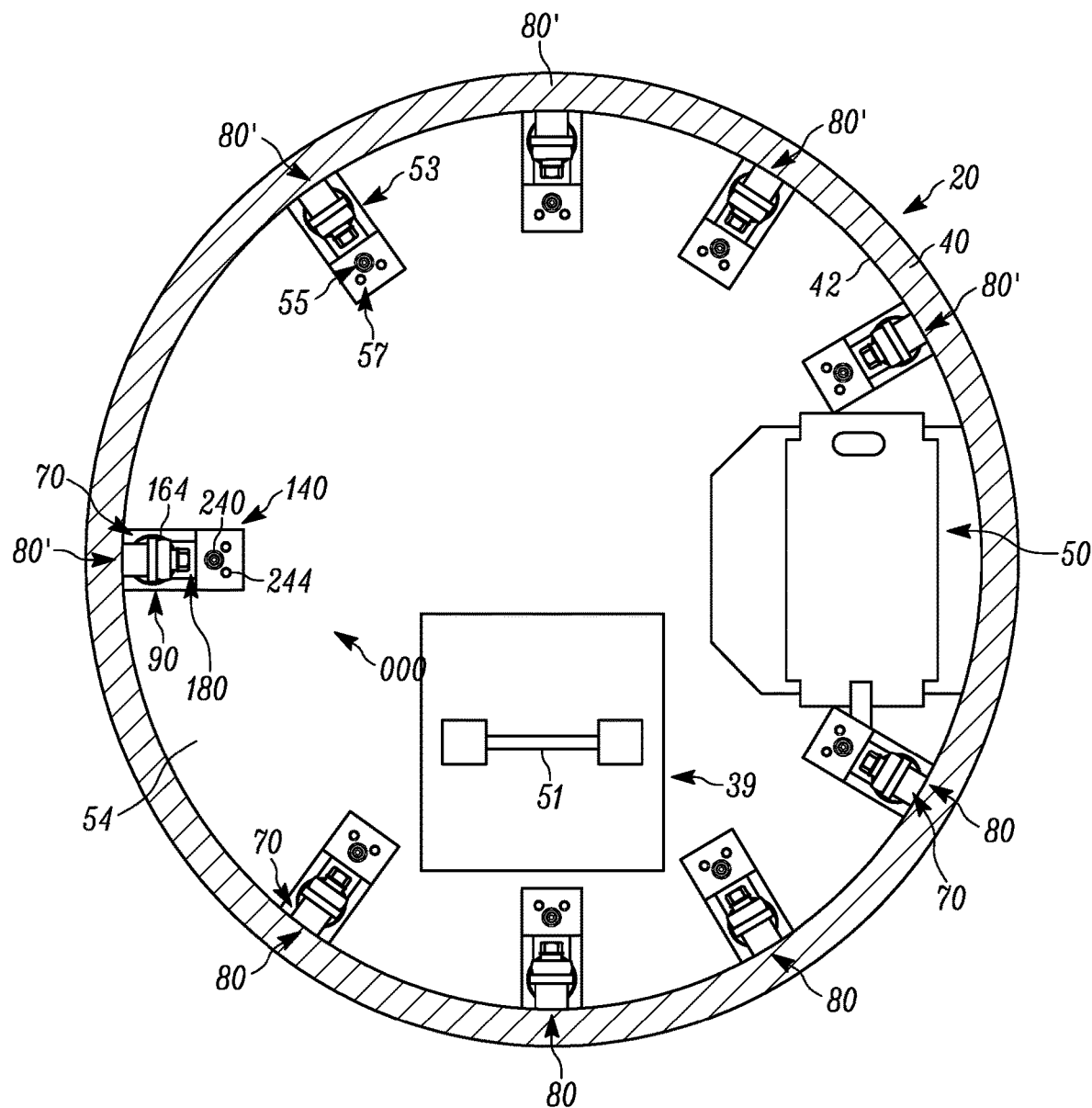
FIG. 2B is a top view of a first deck within the wind turbine of FIG. 1.
Figure 2C:
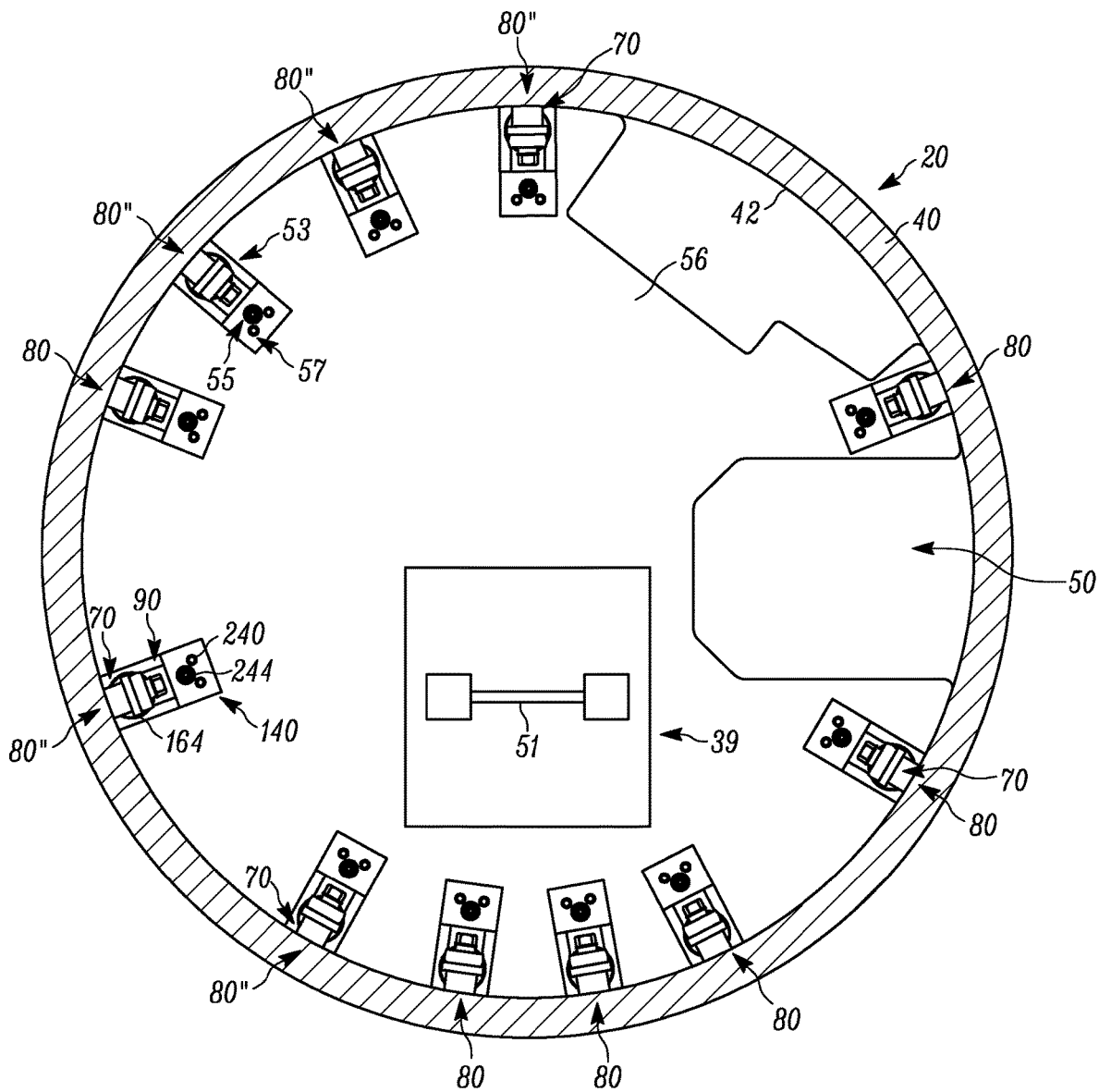
FIG. 2C is a top view of a second deck within the wind turbine of FIG. 1.

Referring to FIGS. 2A-2C, the tower 20 has a wall 40 defining an interior shaft 50 extending along the length of the tower. A ladder 51 extends within the shaft 50 and allows a service technician, employee, etc. to access different parts of the wind turbine 10. This may be desirable to perform inspections, maintenance, repairs, etc. To this end, platforms or decks are provided within the shaft 50 to provide workspaces for the individual. In one example, the tower 20 includes a first deck 52, saddle deck 54 (FIG. 2B), and yaw deck 56 (FIG. 2C).

The saddle deck 54 mimics the shape of the shaft 50 and, thus, as shown the deck is generally circular and centered on the axis 22. The deck 54 includes opposing first and second surfaces 46, 48. Notches 53 are provided along the periphery of the deck 54 and are circumferentially spaced about the axis 22. The notches 53 can be symmetrically (as shown) or asymmetrically (not shown) arranged about the axis 22.

First openings 55 extend through the deck 54 and are circumferentially arranged about the axis 22. The first openings 55 are radially aligned with the notches 53 and, thus, the number of first openings equals the number of notches. Second openings 57 extend through the deck 54 and are associated with each first opening 55. More specifically, a pair of second openings 57 is associated with each first opening 55 and is located radially inward of the first opening. The second openings 57 can be circular. A third opening 59 extends through the deck 54 and is sized to allow both the ladder 51 and the individual on the ladder to readily pass through the deck.

Figure 4:
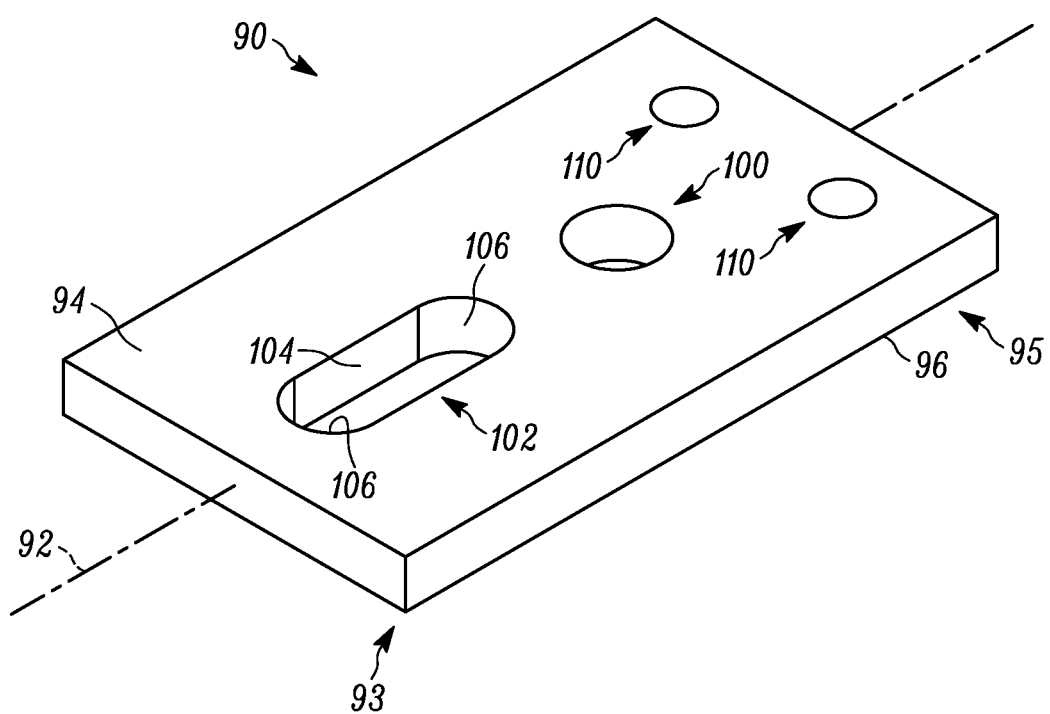
FIG. 4 is a perspective view of a bracket of the articulating joint.

Referring to FIG. 4, bosses 70 are secured to an inner surface 42 of the tower 20 within the shaft 50. The bosses 70 could alternatively be integrally formed with the wall 40 (not shown). In any case, the bosses 70 constitute part of the tower 20. The location and spacing of the bosses 70 coincides with the location and spacing of the notches 53 in each deck 52, 54, 56. The boss 70 is cylindrical and extends along a centerline 72 from a first end 74 to a second end 76. The first end 74 is fixed to the inner surface 42 of the tower wall 40 by, for example, welding. A threaded passage 78 extends from the second end 76 towards the first end 74 and along the centerline 72.

Figure 3:
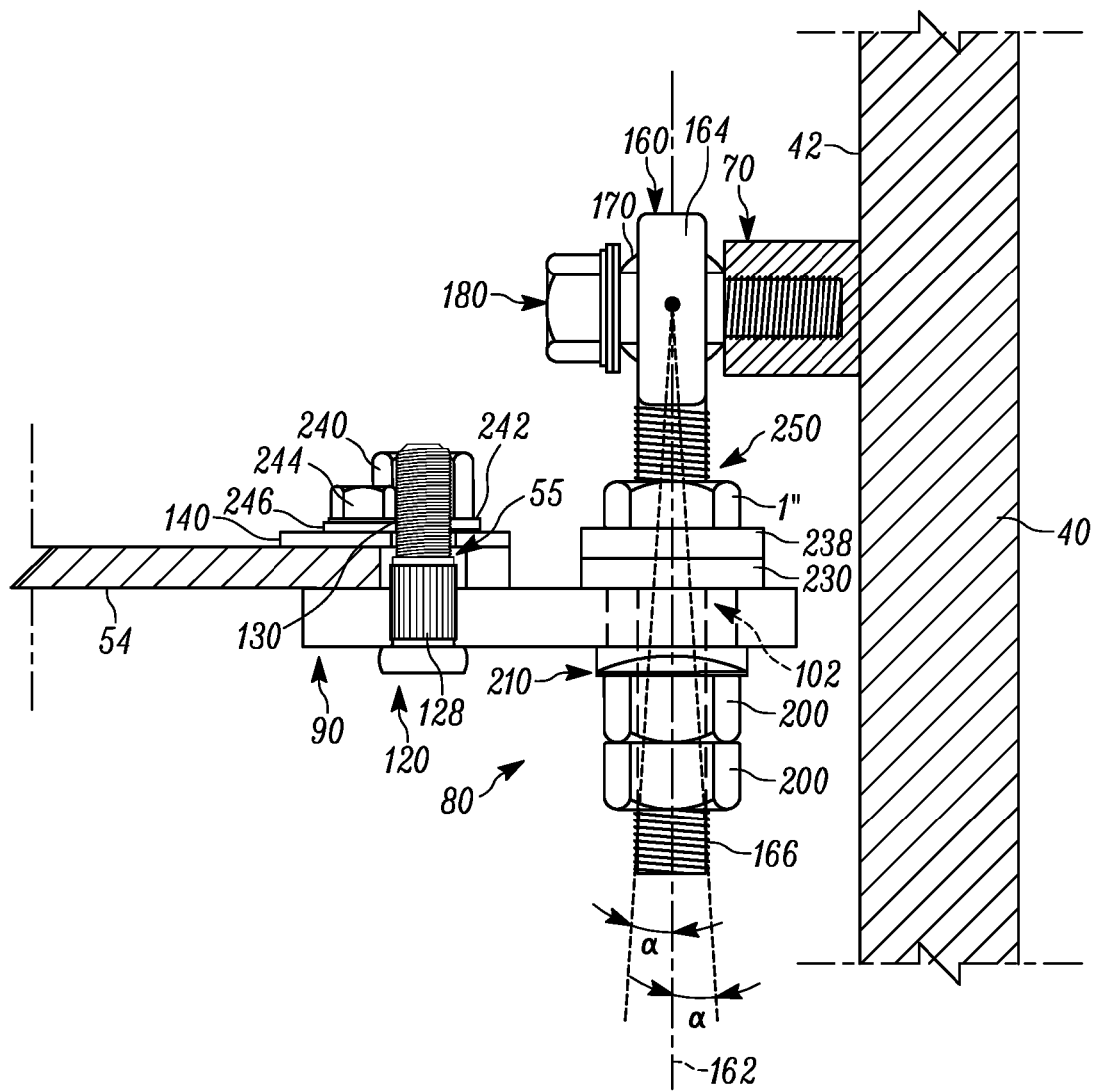
FIG. 3 is an enlarged view of a portion of FIG. 2A illustrating an example articulating joint.

One or more articulating joints 80 connect each deck 52, 54, 56 to the bosses 70 associated therewith to secure the decks to the tower 20. As shown in FIG. 3, each articulating joint 80 includes a bracket 90, multiples fasteners 120, 160, 180, a cap plate 140, a washer 210, and a damper 230. The bracket 90 (FIG. 4) is planar and extends along a centerline 92 from a first end 93 to a second end 95. The bracket 90 includes opposing first and second surfaces 94, 96 that can extend parallel to one another. A first opening 100 extends through the bracket 90 and is positioned along the centerline 92 at the first end 93. The first opening 100 can be circular.

A second opening 102 extends through the bracket 90 and is positioned along the centerline 92 at the second end 95. The second opening 102 is elongated or oval and includes a pair of curved portions 106 spaced from one another. A linear portion 104 having a length indicated generally at L connects the curved portions 106. A pair of third openings 110 extends through the bracket 90 on opposite sides of the centerline 92 adjacent the first opening 100. The third openings 110 can be circular.

Figure 5:
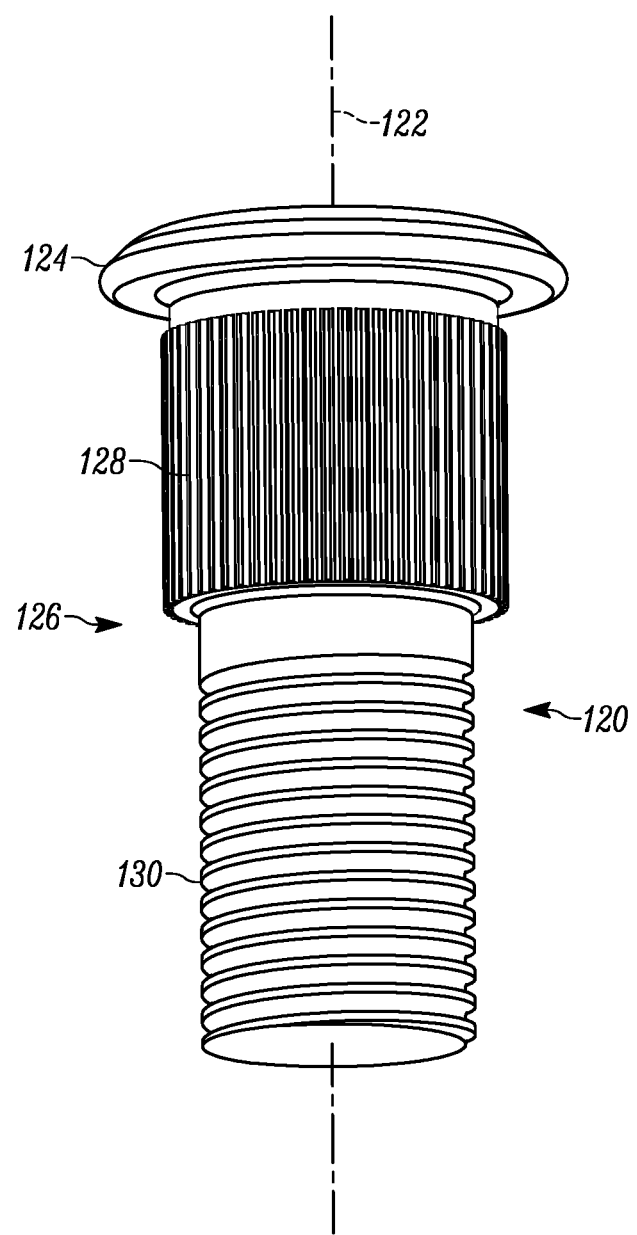
FIG. 5 is a perspective view of a fastener of the articulating joint.

Referring to FIG. 5, the first fastener 120 is an elongated bolt that extends along a centerline 122. The first fastener 120 includes a head 124 and a shaft 126 extending from the head along the centerline 122. The shaft 126 includes a splined portion 128 extending from the head 124 and a threaded portion 130 extending from the splined portion. The splined portion 128 has a larger diameter than the diameter of the threaded portion 130.

Figure 6:
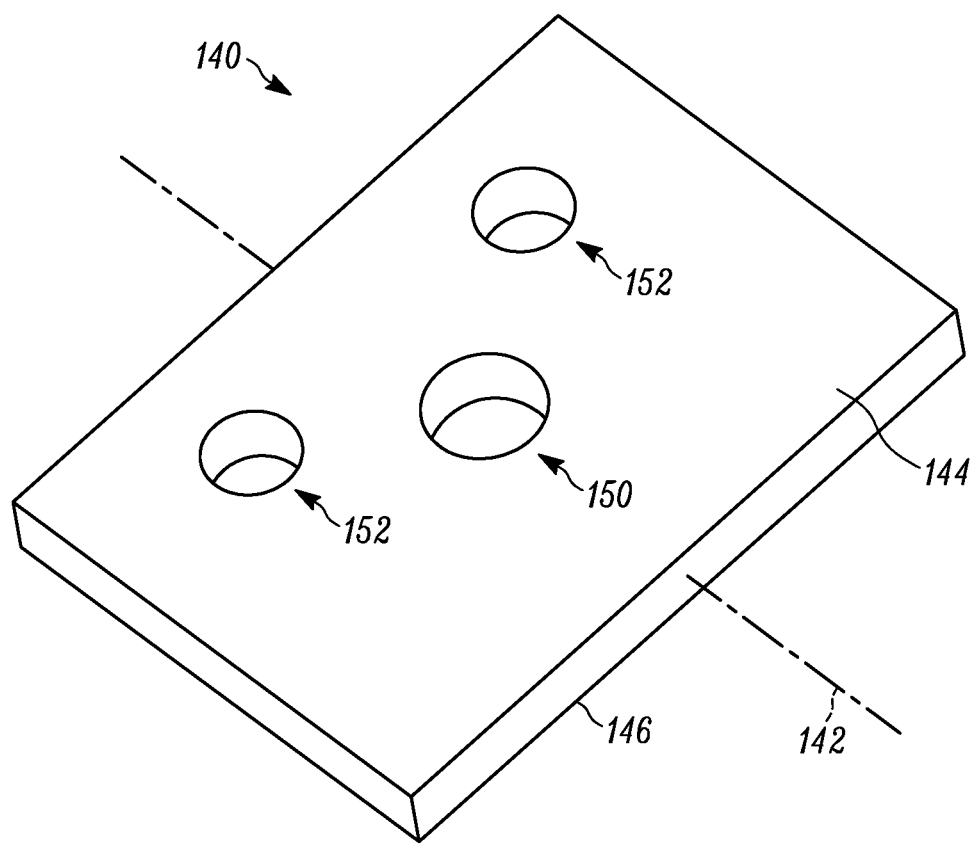
FIG. 6 is a perspective view of a cap plate of the articulating joint.

The cap plate 140 (FIG. 6) is planar and extends along a centerline 142. The cap plate 140 includes opposing first and second surfaces 144, 146 that can extend parallel to one another. A first opening 150 extends through the cap plate 140 and is positioned along the centerline 142. The first opening 150 can be circular.

A pair of second openings 152 extends through the cap plate 140 on opposite sides of the centerline 142. The second openings 152 can be circular and are axially spaced from the first openings 150. The first and second openings 150, 152 in the cap plate 140 have the same shape and spatial arrangement as the first opening 100 and third openings 110, respectively, in the bracket 90.

Figure 7:
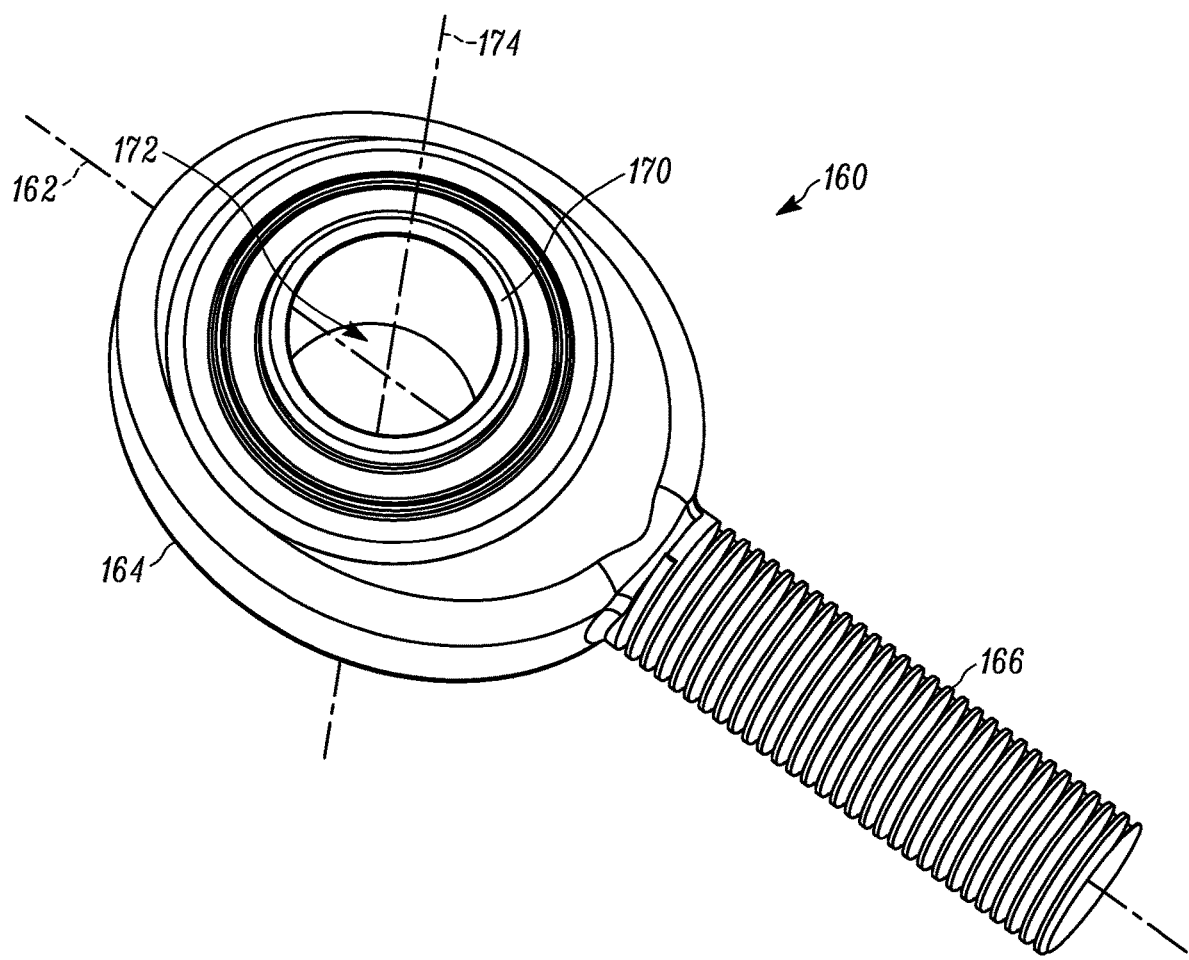
FIG. 7 is a perspective view of another fastener of the articulating joint.

The second fastener 160 (FIG. 7) is elongated and extends along a centerline 162. In one example, the second fastener 160 is a heim joint or rod end bearing. The second fastener 160 includes a hollow head or casing 164 and a threaded shaft 166 extending from the casing along the centerline 162. Portions of the shaft 166 can be unthreaded (not shown). A ball swivel 170 is rotatably mounted within the casing 164 and defines an opening 172 extending along an axis 174. The axis 174 therefore changes directions as the ball swivel 170 moves relative to the casing 164 and centerline 162. The ball swivel 170 is capable of 360° articulation within the casing 164.

Figure 8:
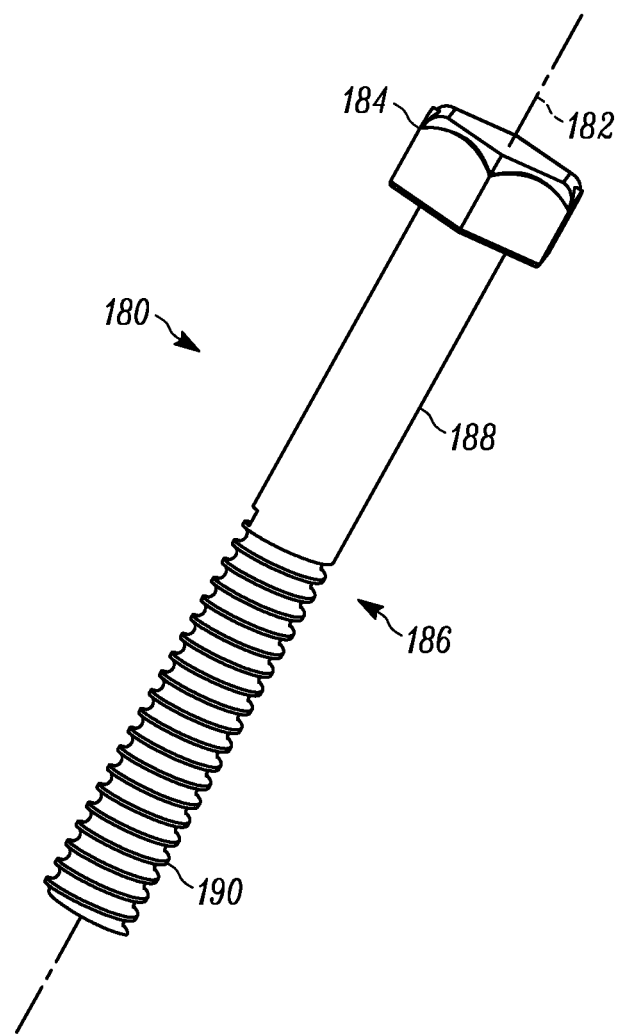
FIG. 8 is a perspective view of yet another fastener of the articulating joint.

The third fastener 180 (FIG. 8) is elongated and extends along a centerline 182. The third fastener 180 includes a head 184 and a shaft 186 extending from the head along the centerline 182. The shaft 186 includes an unthreaded portion 188 extending from the head 184 and a threaded portion 190 extending from the unthreaded portion.

Figure 9:
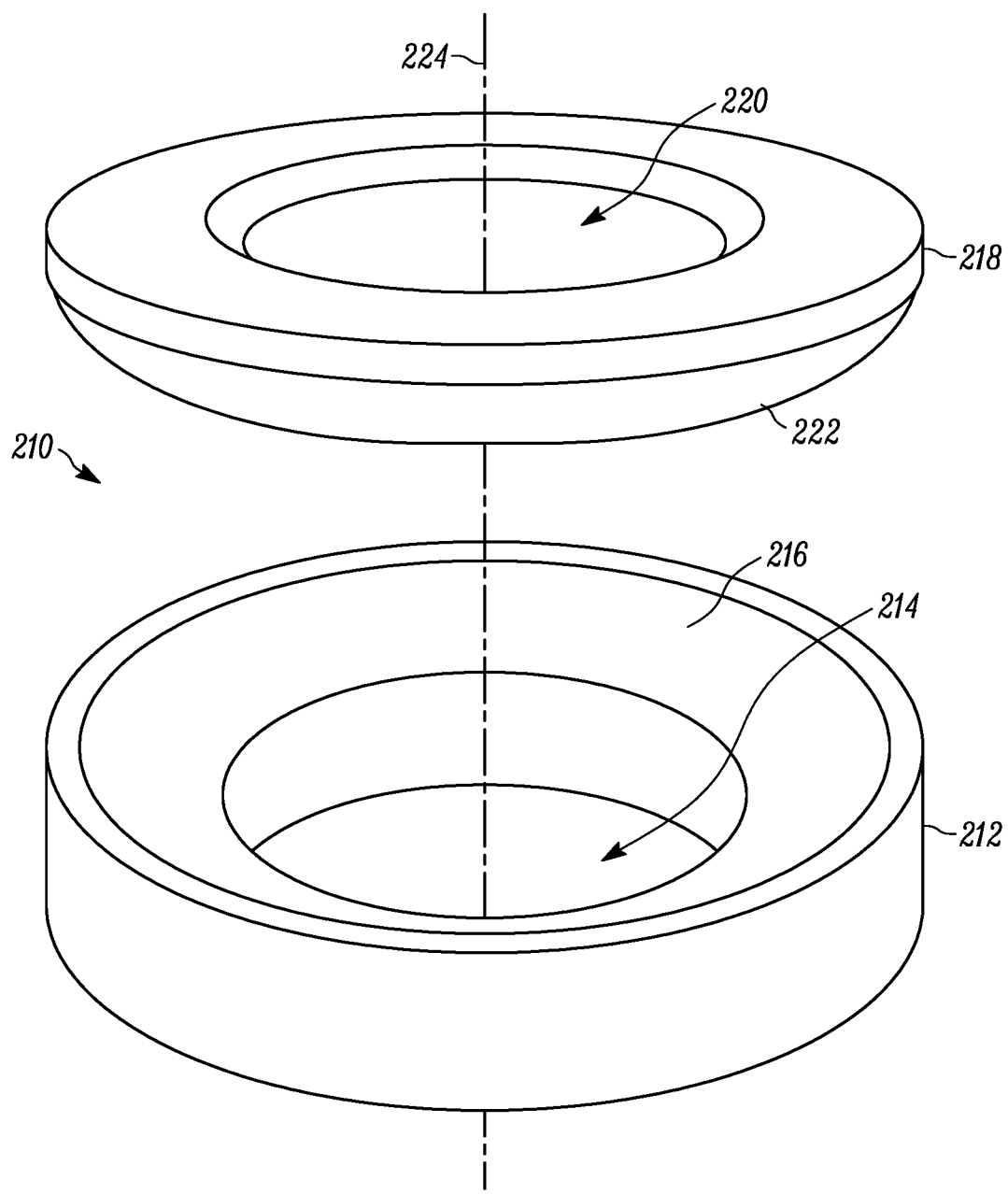
FIG. 9 is a perspective view of a bearing of the articulating joint.

The washer 210 (FIG. 9) can be a spherical washer and includes a first and second ring-shaped members 212, 218. A circular opening 214 extends entirely through the first member 212. One side of the first member 212 includes a concave tapered or frustoconical surface 216 encircling the opening 214. A tapered opening 220 extends entirely through the second member 218. One side of the second member 218 includes a convex tapered or frustoconical surface 222 encircling the opening 220. When the washer 210 is assembled, the openings 214, 220 are aligned along a common centerline 224. The surfaces 216, 222 engage one another and cooperate to allow for relative movement between the first and second members 212, 218 about the axis 224.

Figure 10:
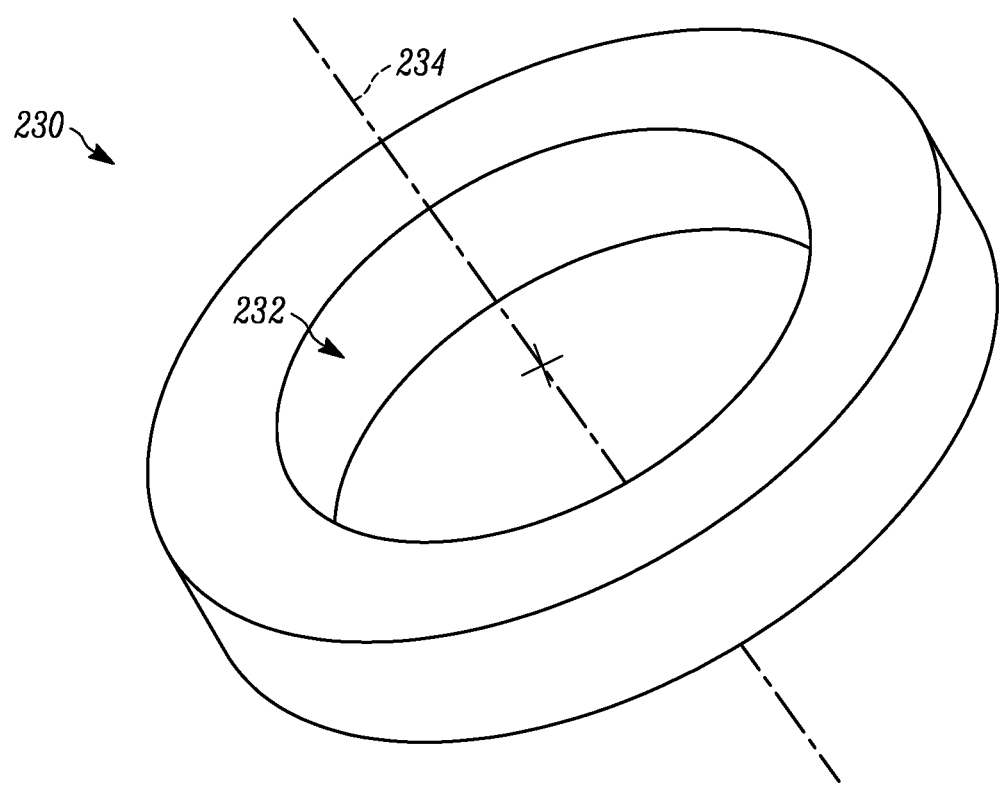
FIG. 10 is a perspective view of a damper of the articulating joint.

The damper 230 (FIG. 10) is ring-shaped and includes a passage 232 extending along an axis 234. The damper 230 is formed from a resilient material, such as an elastomer, that is capable of undergoing compression without plastically deforming.

It will be appreciated that an articulating joint 80 can be provided at one or more of the notches 53 in each deck 52, 54, 56 and connected to a corresponding boss 70 on the tower wall 40. Both FIGS. 2B and 2C show an articulating joint 80 at each and every notch 53. The number and spatial arrangement of the articulating joints 80, however, can differ from that shown and can differ between decks 54, 56. In one example, only the articulating joints denoted by 80' are provided on the saddle deck 54 and only the articulating joints denoted 80" are provided on the yaw deck 56. In each case, the remaining notches 53 on the respective decks 54, 56 can be associated with an existing connection between the deck and tower wall 40. In any case, only the connection between a single articulating joint 80 and a boss 70 is discussed for brevity.

When the articulating joint 80 is assembled, the opening 172 in the second fastener 160 is aligned with the threaded portion 78 in the boss 70. The threaded portion 190 of the third fastener 180 extends through the opening 172 and is threadably engaged with the threaded portion 78 in the boss 70. The unthreaded portion 188 is positioned in the opening 172 of the ball swivel 170 and can have a slip fit or pretty fit connection therewith. In any case, the centerline 72 of the boss 70 is coextensive with the centerline 182 of the third fastener 180 and the axis 174 of the second fastener 160. The second and third fasteners 160, 180 are rotatable relative to one another about the axis 174.

The deck 54 is positioned between the cap plate 140 and the bracket 90. More specifically, the deck 54 engages the second surface 146 of the cap plate 140 and the first surface 94 of the bracket 90. The cap plate 140 can be provided when the first surface 94 of the bracket 90 has a contour that is undesirable for clamping the deck 54 to the bracket 90, such as ribbed or textured.

The first openings 55, 100, 150 in the deck 54, bracket 90, and cap plate 140, respectively, are aligned with one another. The second openings 57, 152 in the deck 54 and cap plate 140 are aligned with one another and with the third openings 110 in the bracket 90. The first fastener 120 extends through the aligned openings 55, 100, 150 such that the shaft 126 extends through the bracket 90, deck 54, and cap plate 140 to a position axially beyond the cap plate. The head 124 of the first fastener 120 abuts the second surface 96 of the bracket 90. The splined portion 128 is positioned within the first opening 100 in the bracket 90. The splined portion 128 can be press fit into the first opening 100 to prevent relative rotation between the first fastener 120 and the bracket 90.

The threaded portion 130 extends axially beyond the cap plate 140 and receives a lock nut 240, e.g., a nord-lock. A washer 242, e.g., a nord-lock washer, is positioned between the nut 240 and the cap plate 140. The nut 240 and washer 242 cooperate to help prevent relative rotation between the first fastener 120 and the deck 54, bracket 90 and cap plate 140. That said, the cap plate 140 can be omitted when the portion of the first surface 94 aligned with the washer 242 is smooth or otherwise conducive to gripping by the washer.

Fasteners 244 extend through each second opening 152 in the cap plate 140 and the associated second opening 57 in the deck 54 and third opening 110 in the bracket 90. A washer 246, e.g., a nord-lock washer, is connected to each fastener 244. Taken in combination with the first fastener 120, this forms a multi-point, secure connection between the deck 54, bracket 90, and cap plate 140 that prevents relative rotational or axial movement between the deck, bracket, and cap plate. Consequently, the deck 54, bracket 90, and cap plate 140 move together as a single, unitary component during use/operation of the wind turbine 10. It will be appreciated that the first end 93 of the bracket 90 can be fixed to the deck 54 in alternative manners, e.g., by welding, clamping or other fastener configuration shown, so long as relative movement between the deck and bracket is prevented.

The second fastener 160 extends through the second opening 102 in the bracket 90. The washer 210 is positioned adjacent the first surface 94 of the bracket 96 with the openings 214, 220 in the first and second members 212, 218 aligned with the second opening 102 and the second member 218 facing away from the bracket. The shaft 166 of the second fastener 160 extends through the openings 214, 220 and is sized to form a slip fit with the second member 218 such that pivotable movement of the shaft 166 about the centerline 182 articulates the second member within and relative to the first member 212. The shaft 166, however, is axially movable along the centerline 162 relative to the washer 210. One or more nuts 200 are threaded onto the shaft 166 to clamp the washer 210 between the nuts and the second surface 96 of the bracket 90.

The damper 230 abuts the first surface 94 of the bracket 90 with the passage 232 of the damper aligned with the second opening 102 in the bracket. The shaft 166 of the second fastener 160 extends through the passage 232. A washer 248 abuts the top of the damper 230 and encircles the shaft 166. A nut 250 is threaded onto the shaft 166 and abuts the washer 248 to clamp the damper between the nut and the bracket 90.

The ball swivel 172 connected to the third fastener 180 enables the second fastener 160 to pivot about the shaft 186 of the third fastener in the manner indicated generally by the arrow $R_1$. This can provide a predetermined range of movement, indicated at a, in every direction relative to the centerline 162, i.e., the movement is not limited to the left-to-right direction shown in FIG. 3. In one example, the range of movement a can be about 5° in every direction relative to the centerline 162. It will be understood that the range of movement is relative to an initial or neutral position of the centerline 162 extending perpendicular to the centerline 182 of the third fastener 180 when no relative movement between the deck 54 and tower 20 has occurred. The pivoting second fastener 160 compresses the damper 230, which damps movement of the second fastener relative to the bracket 90.

The articulating joints 80 are provided around the periphery of the deck 54 at each notch 53 and connected to a corresponding boss 70 on the wall 40 of the tower 20. Each articulating joint 80 allows for relative movement between the deck 54 and the tower 20. This can occur during operation of the wind turbine 10, in response to weather, shifting of the ground 14 or in response to any other situation that places stress on the deck and/or tower.

That said, forces on the deck 54 and/or tower 20 are accommodated by the articulating joints 80. More specifically, each second fastener 160 pivots in the manner $R_1$ to allow the deck 54 and tower 20 to move relative to one another without placing undue stress on the deck, tower or components of the articulating joint 80. To this end, the relative movement helps mitigate or alleviate prying action on the third fasteners 180, thereby providing a more reliable, robust connection between the deck 54 and the tower 20. Furthermore, the damper 230 helps damp movement of the second fastener to thereby damp relative movement between the deck 54 and tower 20. It will be appreciated, however, that the damper 230 can be omitted depending on the expected forces on and/or relative movement between the deck 54 and tower 20.

The articulating joints 80 described herein are also advantageous in that they can be installed within existing wind turbines. More specifically, the rigid connections in existing turbines can be removed and the deck reattached to the tower wall with the articulating joints 80 with little or no modifications to the deck or tower wall. To this end, the articulating joints 80 can be configured to accommodate existing bosses along the tower wall, the existing notches in the deck, and any existing fastener-receiving holes in the deck. This reduces installation time and allows on-site technicians to remove the existing fastening structure and replace it with the articulating joint 80 with little more than a wrench and drill.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An articulating joint for a wind turbine having a tower defining a shaft and a deck provided in the shaft, comprising:
   a bracket extending from a first end having a fixed connection with the deck to a second end including an opening;
   a fastener including a head pivotably connected to the tower and a shaft extending through the opening; and a washer connected to the bracket and aligned with the opening for receiving the shaft such that the fastener is pivotable with the washer relative to the opening to allow for relative movement between the tower and the deck.

2. The articulating joint recited in claim 1, wherein the fastener is a heim joint including a ball swivel.

3. The articulating joint recited in claim 2 further comprising a second fastener extending through the ball swivel and secured to the tower such that the heim joint pivots about the second fastener.

4. The articulating joint recited in claim 3, wherein the second fastener is threadably engaged with a boss on the tower.

5. The articulating joint recited in claim 2, wherein the ball swivel includes a polymer liner.

6. The articulating joint recited in claim 1 further comprising a bolt having a head and a shaft, the shaft including a splined portion having a press-fit connection with a second opening in the bracket and the threaded portion extending through the deck for providing the fixed connection between the first end of the bracket and the deck.

7. The articulating joint recited in claim 6 further comprising a cap plate engaging a first side of the deck, the bracket engaging a second side of the deck opposite the first side, the bolt extending through the cap plate, the deck, and the bracket with the threaded portion of the bolt secured to a nut to clamp the cap plate, the deck, and the bracket together.

8. The articulating joint recited in claim 7, wherein the nut is a nord lock nut that cooperates with a nord lock washer positioned between the nut and the cap plate to prevent relative rotation between the nut and the bolt.

9. The articulating joint recited in claim 1, further comprising a damper through which the shaft of the fastener extends for damping relative movement between the tower and the deck.

10. The articulating joint recited in claim 1, wherein the opening is elongated and includes a pair of round portions and a linear portion positioned between the round portions.

11. The articulating joint recited in claim 10, wherein the fastener is pivotable within the elongated opening about 5° from an initial position of the centerline of the fastener.

12. The articulating joint recited in claim 1 further comprising at least one nut threadably engaged with the shaft of the fastener for clamping the washer against the bracket.

13. An articulating joint for a wind turbine having a tower defining a shaft and a deck provided in the shaft, comprising:
a bracket extending from a first end having a fixed connection with the deck and including a first opening to a second end including an elongated second opening, the bracket being positioned on a first side of the deck;
a cap plate positioned on a second side of the deck and including an opening aligned with the first opening in the bracket;
a bolt having a head and a shaft, the shaft including a splined portion having a press-fit connection with the first opening in the bracket and a threaded portion extending through the deck for securing the bracket to the deck;
a heim joint including a head pivotably connected to the tower and a shaft extending through the elongated second opening in the bracket;
a washer connected to the bracket and aligned with the elongated second opening for receiving the shaft such that the heim joint is pivotable with the washer relative to the elongated second opening to allow for relative movement between the tower and the deck; and
a damper through which the shaft of the heim joint extends for damping relative movement between the tower and the deck.

14. The articulating joint recited in claim 13, wherein the fastener is pivotable within the elongated opening about 5° from an initial position of the centerline of the fastener.

15. A method for connecting a deck inside a shaft of a wind turbine to a wall of the wind turbine, comprising the steps of:
providing a bracket extending from a first end to a second end including an opening;
securing the first end of the bracket to the deck;
pivotably connecting a head of a fastener to the wall of the shaft of the wind turbine such that a shaft of the fastener extends through the opening in the bracket; and
inserting the shaft through a washer connected to the bracket and aligned with the opening such that the fastener is pivotable with the washer relative to the opening to allow for relative movement between the tower and the deck.

16. The method recited in claim 15 further comprising inserting a second fastener through a ball swivel of the fastener and into threaded engagement with a boss on the wall of the tower.

17. The method recited in claim 15 further comprising inserting the shaft through a damper aligned with the opening in the bracket for damping relative movement between the fastener and the bracket.

18. The method recited in claim 15, wherein securing the first end of the bracket to the deck comprises:
positioning a cap plate against the deck such that an opening in the cap plate is aligned with a second opening in the bracket on opposite sides of the deck;
inserting a bolt through the opening in the cap plate and the second opening in the bracket; and
connecting a nut to the bolt to fix the first end of the bracket to the bracket and the deck.

19. The method recited in claim 18 further comprising providing a nord lock between a washer engaging the cap plate and the nut.

* * * * *